Sept. 26, 1961 R. J. McGONEGLE 3,001,713
INTEGRATORS
Filed Sept. 24, 1956 3 Sheets-Sheet 1

INVENTOR.
BY R.J. McGONEGLE
ATTORNEY

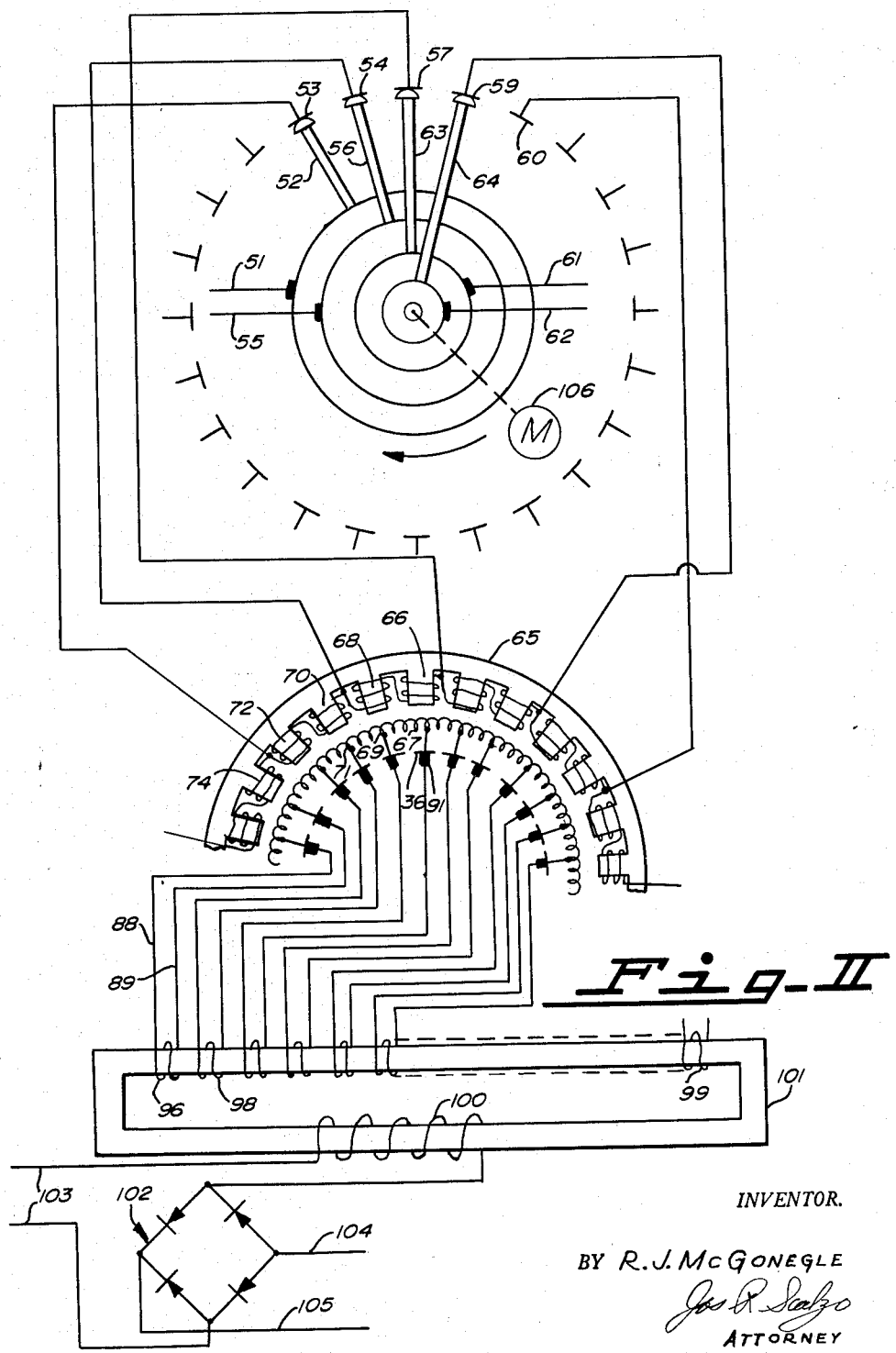

Sept. 26, 1961  R. J. McGONEGLE  3,001,713
INTEGRATORS
Filed Sept. 24, 1956  3 Sheets-Sheet 3
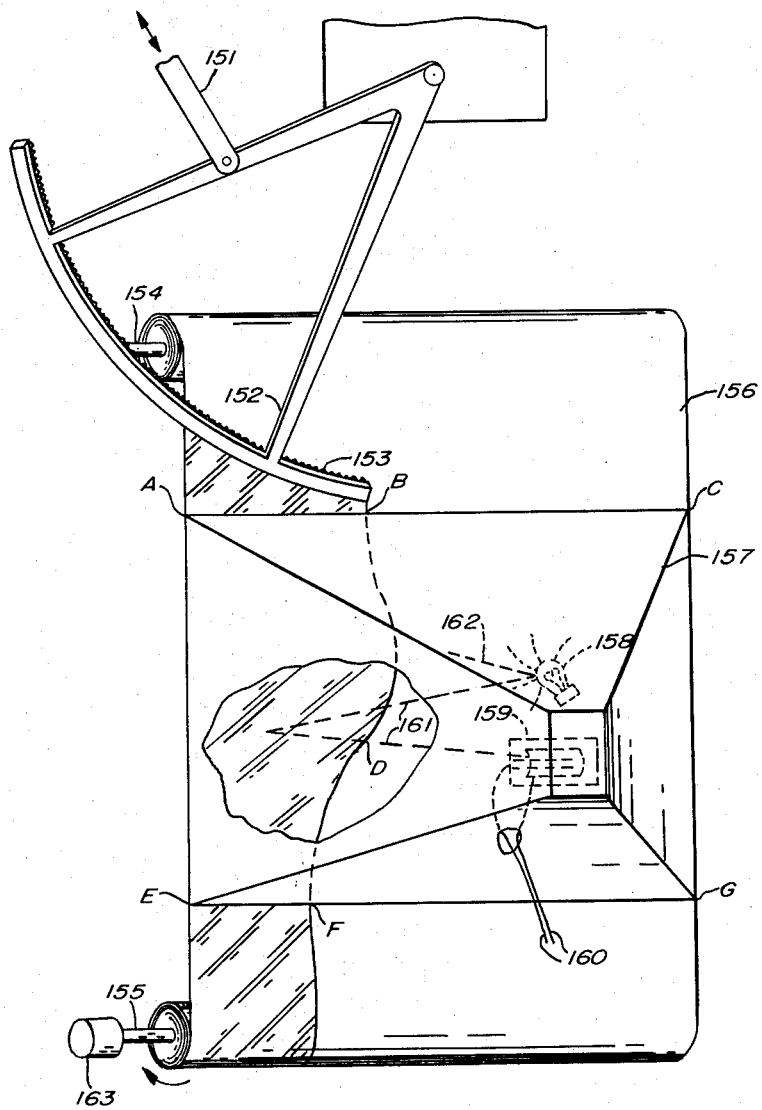
Fig. III
INVENTOR.
BY R. J. McGONEGLE
ATTORNEY

United States Patent Office 3,001,713
Patented Sept. 26, 1961

3,001,713
INTEGRATORS
Richmond J. McGonegle, Old Ovoca Road,
Tullahoma, Tenn.
Filed Sept. 24, 1956, Ser. No. 611,545
2 Claims. (Cl. 235—183)

This invention relates to a device to continuously integrate instantaneous magnitudes during a definite time period, the definite time period progressing with elapsed time and immediately preceding the present instant of time. The present invention will measure the average value of a variable quantity over the immediately preceding, predetermined interval of time by generating an electrical output potential proportional to the varying quantity to be integrated, the said output a potential proportional to the average value over the definite time period. The devices function as a continuous integrating demand meter.

This invention is useful to determine changes in the flow of electrical power, amperes, liquids, gasses or material with reference to a time period. The rate of production of such quantities is normally limited, and the demand upon the production facilities is often limited or controlled by a certain change in output during a definite time period. For example, the limit of demand upon an electrical generating system may be expressed by: "A change in load shall not exceed 10,000 kilowatts in any 30 second period, either in steps or gradually," and these devices will indicate the kilowatt load during the immediately preceding 30 second period.

Heretofore it has not been possible to obtain a device to continuously indicate the change between one definite time period and another definite time period immediately following by differentiating the continuous electrical output of an integrator. Only differentiating devices for indicating the rate of change at one instant of time have been in use. The object of this invention is to provide a device to continuously integrate the product of a magnitude and a definite time period, with the definite time period progressing with elapsed time, and the output being an electrical quantity suitable to differentiate. Differentiating the output of this invention is useful then to indicate, for example, the change in electrical energy between one particular time period and another similar time period for control of generation of electrical power.

Another object of this invention is to provide an integrating device that not only is efficient in operation but one that is easy to construct, relatively cheap to purchase and simple to install and operate. Other objects will become manifest as further disclosure is made.

Figure 1:
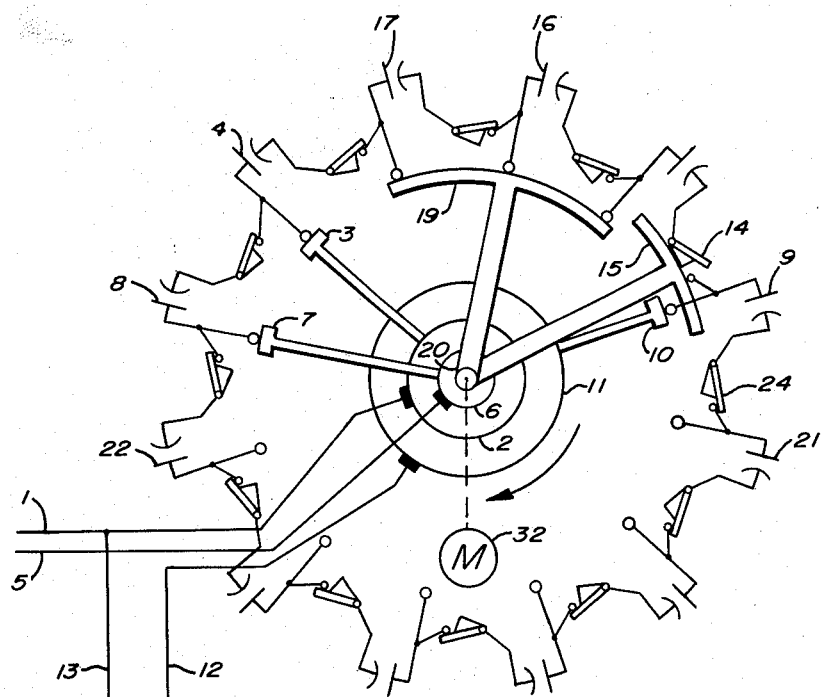
Figure 1:
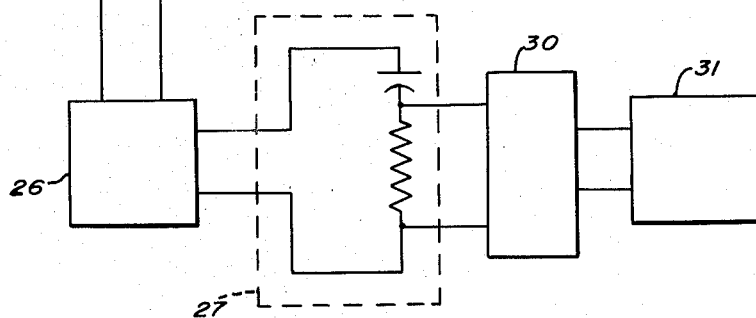

Referring now to the accompanying drawings:

FIGURE 1 is a diagrammatic view of a capacitor type continuous integrator connected to a differentiator and indicator, FIGURE 2 is a diagrammatic view of a direct current dynamo continuous integrator, and FIGURE 3 is a diagrammatic view of a recording chart type continuous integrator.

Referring now to FIGURE 1, numeral 22, 8, 4, etc. are capacitors, and 14 and 24 are normally closed switches, there being an equal number of capacitors and switches. The capacitors and switches are connected alternately and in series, the electrical circuit forming a closed loop. An electrical potential proportional to the magnitude of the quantity under consideration is impressed on leads 1 and 5. Leads 1 and 5 contact slip rings 2 and 6 respectively and slip rings 2 and 6 carry rotating contact arms 3 and 7 respectively. Contact arms 3 and 7 rotate clockwise, and at the position shown, capacitor 8 is charged to a potential proportional to the magnitude of the quantity under consideration at the particular instant. Arm 20 and its contact 19 rotate ahead of arms 3 and 7 to discharge capacitors before being charged by arms 3 and 7. Capacitors 17 and 16, are under discharge in the position shown by short circuiting their terminals. Immediately ahead of arm 20 is another arm and cam 15 for maintaining one switch open so that capacitors will not be affected by charges on adjacent capacitors. Arms 3 and 10 measure the total charge on capacitors 8, 22, 21, 9 and those between 21 and 22. Slip rings 2 and 11, connected to leads 13 and 12 respectively, then are at the potential of arms 3 and 10. All the slip rings and arms rotate at the same speed by clock motor 32, and at a speed so that capactors 9, 21 through 22 and 8 are charged during the definite time period under consideration. If for example the time period is 30 seconds, 30 seconds would be the time for arm 3 to move from the capacitor 9 positions to the position shown at capacitor 4.

To illustrate a useful application of the continuous integrator shown by FIGURE 1, leads 12 and 13, having a potential proportional to the immediate past definite time area, are connected to a differentiator 27 through amplifier 26. The output of the differentiator 27 is connected to an indicator 31 through amplifier 30. Indicator 31 will then show the rate of change of average magnitude between one definite time period and the next.

FIGURE 2 is another embodiment of an integrating device which will accomplish the same results as the integrator described for FIGURE 1. A direct current dynamo is represented by its principal parts as follows: rotating armature coils 67, 69, 71 and so on; commutator bars such as 36; commutator brushes such as 91; stationary high retentivity type magnetic pole-pairs 66 and 68 and 70 and 72; magnetic pole iron yoke 65 (the iron for the armature coils is not shown). The pole-pairs are wound by coils, such as 74, suitable for individually magnetizing and demagnetizing by a switching means for that purpose. The switching means consist of stationary contacts 53, 54, 57, 59 and 60; movable contacts 52, 56, 63 and 64, each attached to a rotating slip ring, the slip rings having external connecting leads 51 and 55, and 61 and 62. All the rotating contacts and slip rings rotate clockwise at the same speed by clock motor 106. At the position of the contacts shown by FIGURE 2, pole-pair 70 and 72 is being magnetized through stationary contacts 53 and 54, movable contacts 52 and 56 from external leads 51 and 55 which are attached to a direct current source proportional to the magnitude of the quantity under consideration, and the pole-pair connected to stationary contacts 57 and 59 is being demagnetized through movable contacts 63 and 64 from external leads 11 and 12 which are attached to an alternating current source not shown. Moving contact 56, for example, moves from stationary contact 60, passing contact 53, to contact 54 during an elapsed time equal to the definite time period under consideration, and during this travel magnetizes each pole-pair to a flux density proportional to the magnitude of the measured quantity under consideration at the particular instant leads 51 and 55 are connected to the particular pole-pair. It is evident then that one pole-pair outside the definite time period group is continually being demagnetized.

The dynamo has a positive and negative brush for each pole-pair, but the circuit for each brush pair is isolated from the other as illustrated by coil 96 connected by leads 88 and 89 to a pair of positive and negative brushes. Coils 98 and 99 are similarly connected.

As the armature rotates in the magnetic fields of the pole-pairs, the sum of the currents in coils 96, 98 and 99 is proportional to the total pole-pair flux, and therefore is proportional to the average magnitude of the quantity under consideration from one end to the other end of the definite time period.

A saturable reactor circuit is shown in FIGURE 2 to provide for one direct-current output on leads 104 and 105 proportional to the sum of the currents in the coils 96, 98 and 99. The saturable reactor consists of an iron core 101; coil 100 connected to an alternating current source through leads 103, and a rectifier 102 for changing the alternating current through coil 100 to direct current for the output signal through leads 104 and 105.

The dotted lines of FIGURE 2 represent the necessary number of contacts, pole-pairs, armature coils and brush circuits to give the necessary number of measured instantaneous magnitudes during a definite time period.

FIGURE 3 is still another embodiment of an integrating device which will accomplish the same results as the integrators described for FIGURES 1 and 2. A strip chart 156 having a surface of low light reflectance unwinds by clock motor 163 from roller 154 to roller 155 at a speed such that point A travels to point E in an elapsed time period equal to the definite time period under consideration. Arm 151 is actuated by a meter or gage registering the magnitude of the quantity under consideration which moves a wide paint brush 153 from A to B across the strip chart. The distance between A and B is proportional to the instantaneous magnitude under consideration, and as the chart moves, the chart is painted with a high reflectance paint to a width proportional to the instantaneous magnitudes. The area A, B, D, F and E then is covered by the reflecting paint. A cover 157 covers the chart from A to E, or the area A, C, G, and E. A light source 158 directs light to area A, C, G and E. Light ray 162 is not reflected, but the light rays, such as 161, which strike the painted portion are reflected to a photo-electric cell 159. Leads 160, with a suitable electric potential source, will carry a current proportional to the area A, B, D, F and E which is proportional to the average magnitude of the quantity under consideration from one end to the other end of the definite time period.

The paint brush 153 can be a multiple pen arrangement with a common ink reservoir. The pens are spaced close enough to cover the chart area with reflecting ink. The pens are similar to the well known recording chart pens. The light 158 is positioned to evenly illuminate the total area of the chart under observation by the photoelectric cell. The light 158 and the photoelectric cell 159 are mounted substantially at the same elevation above the chart and so there is no interference with the light rays between the light 158 and the photoelectric cell 159.

To illustrate a useful application of the continuous integrator, leads 160, having a current proportional to the immediate past definite time area, may be connected to a differentiator through an amplifier. The output of the differentiator is then connected to an indicator. The indicator will then show the rate of change of average magnitude between one definite time period and the next.

What has been described in the preceding discussion are simple, practical and operable devices for accomplishing the purposes of this invention. It is manifest that certain alterations can be made and still remain within the scope of the present invention for which the following is claimed.

I claim:

1. A continuous integrating device consisting of a moving surface of low light reflectance, a means for moving the surface at a predetermined speed, a means for changing the surface to high light reflectance as the surface moves at said predetermined speed so that the area changed has its dimensions perpendicular to the moving axis proportional to the instantaneous magnitudes of an electrical potential, a light source to continuously illuminate a predetermined area of said surface including the high reflectance area, said predetermined area being limited by a cover, a photoelectric cell means to measure the total reflected light from said predetermined area under said cover at any instant of time as said moving surface moves along, the output of said photoelectric cell means being proportional to the average magnitude of said electrical potential over the period of time corresponding to said predetermined area under said cover as said moving surface moves along.

2. A device according to claim 1 including a series condenser and resistor differentiator which receives said output of said photoelectric cell means and a meter connected to indicate the differentiation of said output by said differentiator.

References Cited in the file of this patent

UNITED STATES PATENTS

| 1,323,518 | Ashworth | Dec. 2, 1919 |
| 1,664,243 | Chubb | Mar. 27, 1928 |
| 2,189,107 | Gould | Feb. 6, 1940 |
| 2,540,310 | Wolf | Feb. 6, 1951 |
| 2,680,838 | Harnisch | June 8, 1954 |

FOREIGN PATENTS

| 487,920 | Canada | Oct. 8, 1947 |

OTHER REFERENCES

Electronic Instruments (Greenwood et al.), 1948, page 64.